(12) United States Patent
Tvetene

(10) Patent No.: US 10,932,403 B1
(45) Date of Patent: Mar. 2, 2021

(54) SOD HARVESTERS

(71) Applicant: Gregg Tvetene, Billings, MT (US)

(72) Inventor: Gregg Tvetene, Billings, MT (US)

(73) Assignee: TREBRO HOLDING INC.

( * ) Notice: Subject to any disclaimer, the term of this patent is extended or adjusted under 35 U.S.C. 154(b) by 401 days.

(21) Appl. No.: 15/732,639

(22) Filed: Dec. 7, 2017

(51) Int. Cl.
*A01B 45/00* (2006.01)
*B66F 9/19* (2006.01)

(52) U.S. Cl.
CPC ............ *A01B 45/00* (2013.01); *B66F 9/19* (2013.01)

(58) Field of Classification Search
CPC ........ A01G 20/15; A01G 20/00; B65G 37/00; B65G 57/035; B66F 9/02; B66F 9/12; B66F 9/00; B66F 9/19; B66F 9/195; B66F 9/122; A01B 76/00; B60P 1/4421
USPC ....... 294/67.3, 67.4, 67.41; 248/558, 346.01, 248/346.02, 346.03, 346.06, 346.07, 248/346.5
See application file for complete search history.

(56) References Cited

U.S. PATENT DOCUMENTS

| | | | | |
|---|---|---|---|---|
| 2,973,878 | A * | 3/1961 | Gibson | B66F 9/122 414/664 |
| 3,053,405 | A * | 9/1962 | Holmberg, Jr. | B66F 9/12 414/607 |
| 3,073,613 | A * | 1/1963 | Bergstrom, Jr. | B66F 9/19 280/24 |
| 3,129,833 | A * | 4/1964 | Townsend | B66F 9/19 414/424 |
| 3,180,513 | A * | 4/1965 | Vander Wal | B66F 9/12 414/607 |
| 4,325,669 | A * | 4/1982 | Schafer | B66F 9/19 414/425 |
| 5,692,583 | A * | 12/1997 | Reed | B66F 9/12 187/237 |
| 9,850,114 | B2 * | 12/2017 | Gilland | B66F 9/0754 |
| 2014/0353450 | A1 * | 12/2014 | Hart | F16M 5/00 248/346.02 |
| 2016/0272366 | A1 * | 9/2016 | Cote | B65D 19/385 |

* cited by examiner

*Primary Examiner* — Glenn F Myers
(74) *Attorney, Agent, or Firm* — Johnson & Phung LLC

(57) ABSTRACT

A pallet wedge for slidingly displacing a loaded pallet located on top of the pallet holder through ground engagement of ground runners on the pallet wedge as the pallet holder moves forward until the loaded pallet slides off the pallet wedge.

25 Claims, 8 Drawing Sheets

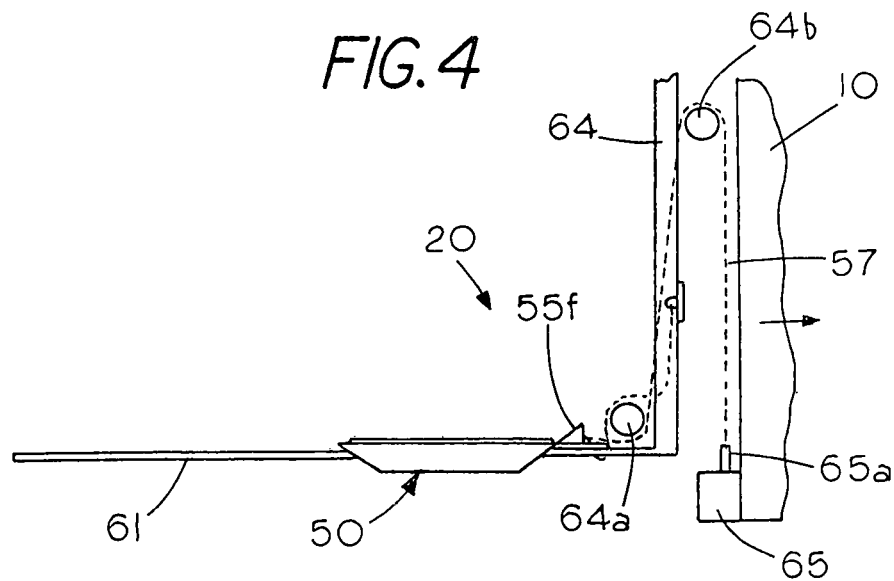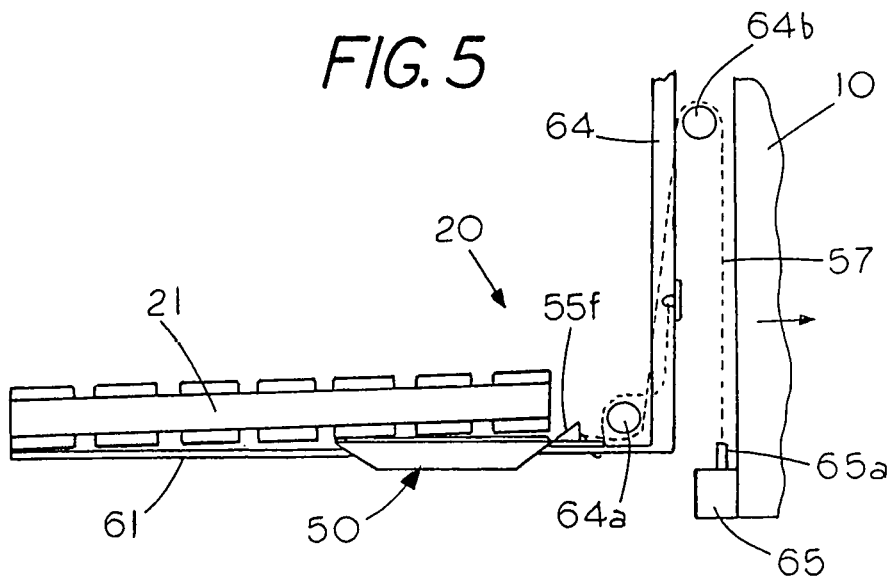

US 10,932,403 B1

SOD HARVESTERS

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

In on-the-go sod harvesting the sod harvester contains a set of internal sod stations and sod transfer mechanisms that require the completion of sequential steps before the sod harvester can transfer a cut sod slab onto a sod pallet, which is typically supported by pallet forks. Once the sod pallet is fully loaded the loaded sod pallet is left on the sod field for later pickup. As the sod harvester continues to cut sod from the sod field the sod harvester automatically replaces the loaded sod pallet, which is left on the sod field, with an empty sod pallet so the internal sod processing can continue. The sod handling cycle of cutting sod and stacking the sod on a sod pallet, which is left on the sod field for later pickup, is then repeated.

One of the ways of reducing the time of the sod handling cycle is to use single sided pallets rather than double sided pallets since a single sided pallet can be quickly loaded onto a set of pallet forks by sliding the pallet onto to the top of the pallet forks as the pallet forks returns to a loading position. In contrast, a double sided pallet requires inserting pallet forks into the opening in the double side pallet so a sod loaded pallet can be removed from the pallet forks through ground engagement of the pallet. Unfortunately, the need to threadingly insert the pallet forks into the opening in the double side pallet increases the length of sod handling cycle as well as the complexity of the sod handling cycle making it difficult and time consuming to use double sided pallets in harvesting and field stacking sod on sod pallets for later pickup even though double sided pallets are an inexpensive alternative.

SUMMARY OF THE INVENTION

A pallet wedge for a sod harvester with the pallet wedge having a set of ground engaging runners, a set of faces for slidingly engaging a pallet fork and a deck for supporting a portion of a double side pallet with the set of ground engaging runners enabling the pallet forks to be withdrawn from beneath the wedge during a forward motion of the sod harvester. The wedge tiltable on the pallet forks in response to forward motion of the sod harvester to urge a portion of the double sided sod pallet into ground engagement so that the forward motion of the sod harvester removes the sod pallet from the pallet forks and the wedge without damaging the sod pallet. Once the sod pallet is free of the pallet forks the pallet forks are raised to a loading position as the wedge is returned to a pallet loading position on the pallet forks.

BRIEF DESCRIPTION OF THE DRAWINGS

FIG. 4 is a side view of a pallet wedge located at the base of a set of pallet forks;

FIG. 5 is a side view of the pallet wedge and the pallet forks of FIG. 4 with a double sided pallet located on the wedge and the pallet forks;

DESCRIPTION OF THE PREFERRED EMBODIMENT

Figure 1:
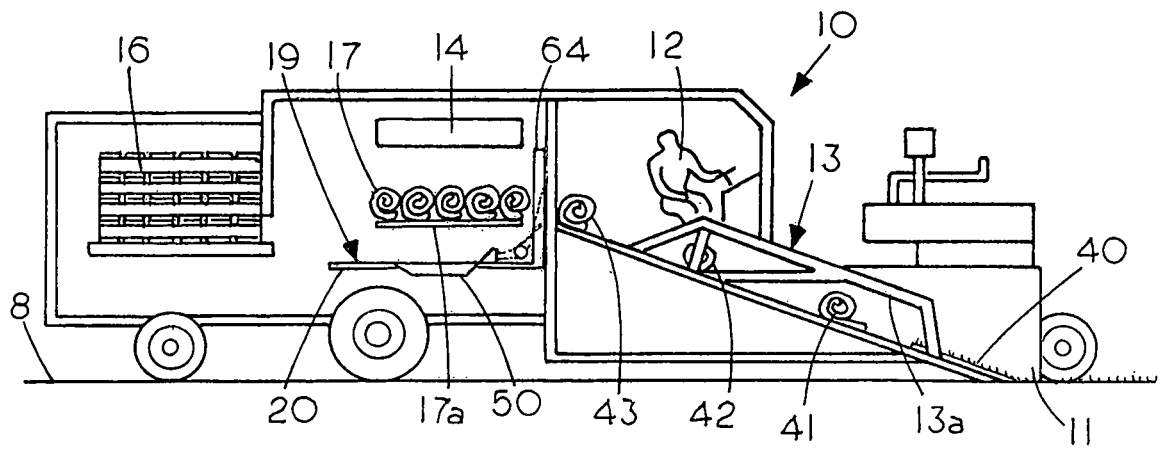
FIG. 1 is a side view of a sod harvester cutting sod slabs from a sod field and internally transferring the sod slabs onto a sod pallet for discharge on to the sod field.

FIG. 1 shows an operator 12 seated on a sod harvester 10 for on-the-go cutting and stacking a plurality of sod slabs for field pickup during a forward motion of the sod harvester. In this example sod harvester 10 includes a first station 13 having a sod cutting blade 11 for cutting a sod slab 40 free from a sod field 8 and an elevator 13a for elevating the sod slabs thereon to a second station 17 as the sod harvester moves forward. FIG. 1 shows multiple sod slabs 41, 42 and 43 located on the sod elevator with each of the sod slabs formed into a sod roll. While the formation of sod rolls from sod slabs is shown in some cases one may prefer to cut and stack the sod slabs without formation of the sod slabs into sod rolls. An example of a sod harvester having a knife for freeing sod and forming a sod slab into a sod roll is shown in my U.S. Pat. No. 6,364,027, which is hereby incorporated by reference.

In this example the sod slabs are formed into sod rolls 41, 42 and 43 and are delivered to a second station comprising a sod accumulator 17 that has a rotatable belt 17a that receives a sod roll on the end of the accumulator 17 proximate the elevator 13a. Once the sod roll is on accumulator belt 17a the top surface of the belt advances to the left to leave an empty space on the accumulator belt to receive an additional sod roll from the first station 13. Typically, the process of loading a sod roll and rotating the belt continues until the accumulator 17 is full, as shown in FIG. 1.

Figure 7:
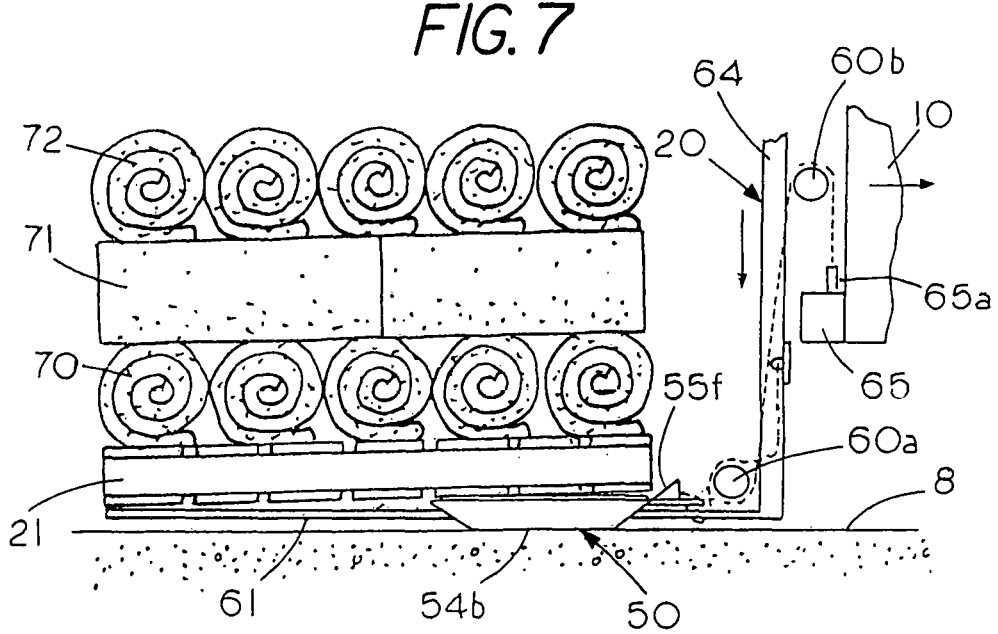
FIG. 7 is a side view of the pallet wedge and the set of pallet forks of FIG. 6 in a ground engaging condition with rolls of sod located on top of the double sided pallet.
Figure 7A:
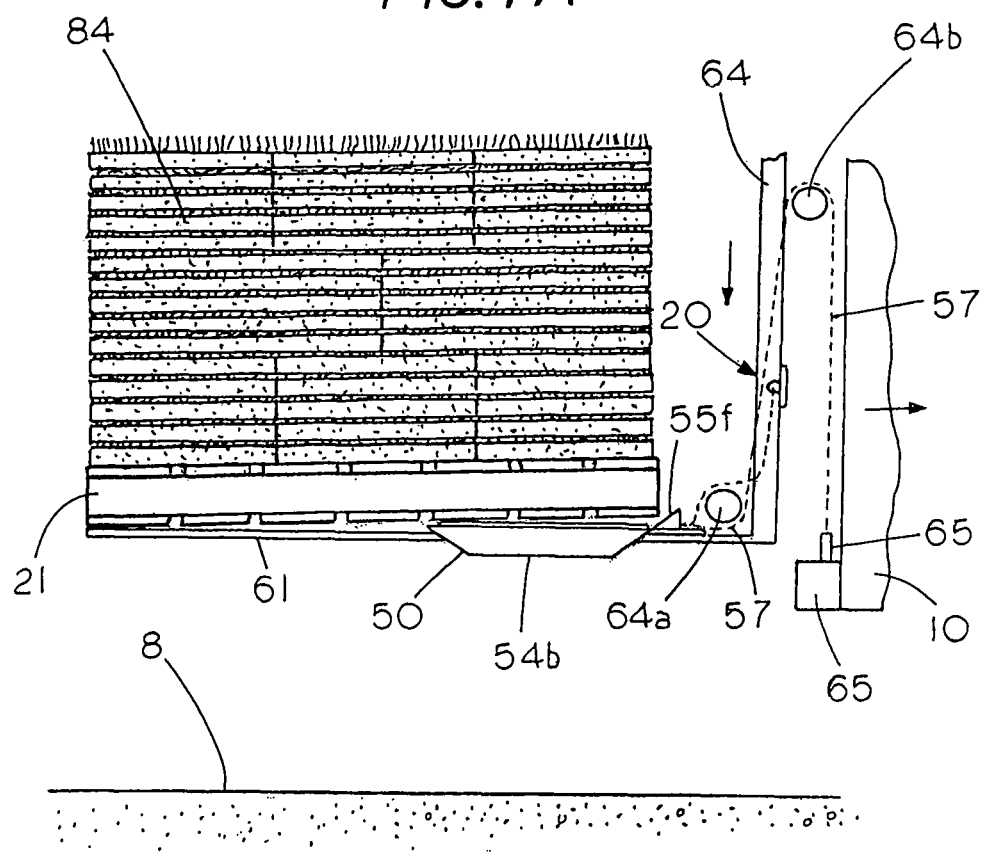
FIG. 7A is a side view of the pallet wedge and the set of pallet forks of FIG. 6 in a ground engaging condition with sod slabs stacked on top of the double sided pallet.

Located within sod harvester 10 is an overhead sod transfer mechanism or sod pick up head 14 for picking up sod rolls resting on accumulator 17 and transferring the sod rolls to a third station 19. An example of a sod transfer mechanism is shown in my U.S. Pat. No. 6,296,063 and is hereby incorporated by reference. Sod harvester 10 includes a stack of double sided pallets 16 which are to be loaded one at a time onto a pallet holder 20 that comprise a set of pallet forks 61, 62, which contain a wedge 50 (FIG. 3) to facilitate removal of a loaded double sided pallet from pallet holder 20 and pallet frame 64 through ground engagement of the loaded double sided pallet and wedge 50. While sod harvester 10 shows the cutting and forming of sod slabs into sod rolls and subsequent stacking of sod rolls on a double sided pallet 21 the sod slabs may be retained in slab form during the handling and loading on pallet 21 since a pallet loaded with sod slabs in either flat form as shown in FIG. 7A or roll form as shown in FIG. 7 can be removed through ground engagement of pallet wedge 50.

Figure 1A:
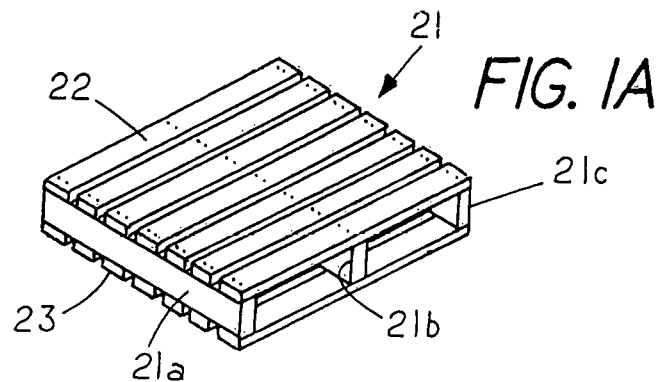
FIG. 1A is a perspective view of an empty double sided pallet.

FIG. 1A is a perspective view of a doubled sided sod pallet 21 revealing a set of rigid wood rails 21a, 21b and 21c with a first set of boards 22 secured to one side of the rails to form a first platform coextensive with the rails 21a, 21b, and 21c and a second set of boards 23 secured to the opposite side of the rails to form a second platform also coextensive with rails 21a, 21b, and 21c.

In operation of the sod harvester of FIG. 1 the sod handling cycle includes the cutting of a sod slab free from sod field 8, the overhead sod transfer within sod harvester 10 and the transfer of a loaded double sided sod pallet onto sod field 8 for machine pickup through ground engagement of slideable wedge 50 carried by pallet holder 20.

Figure 2:
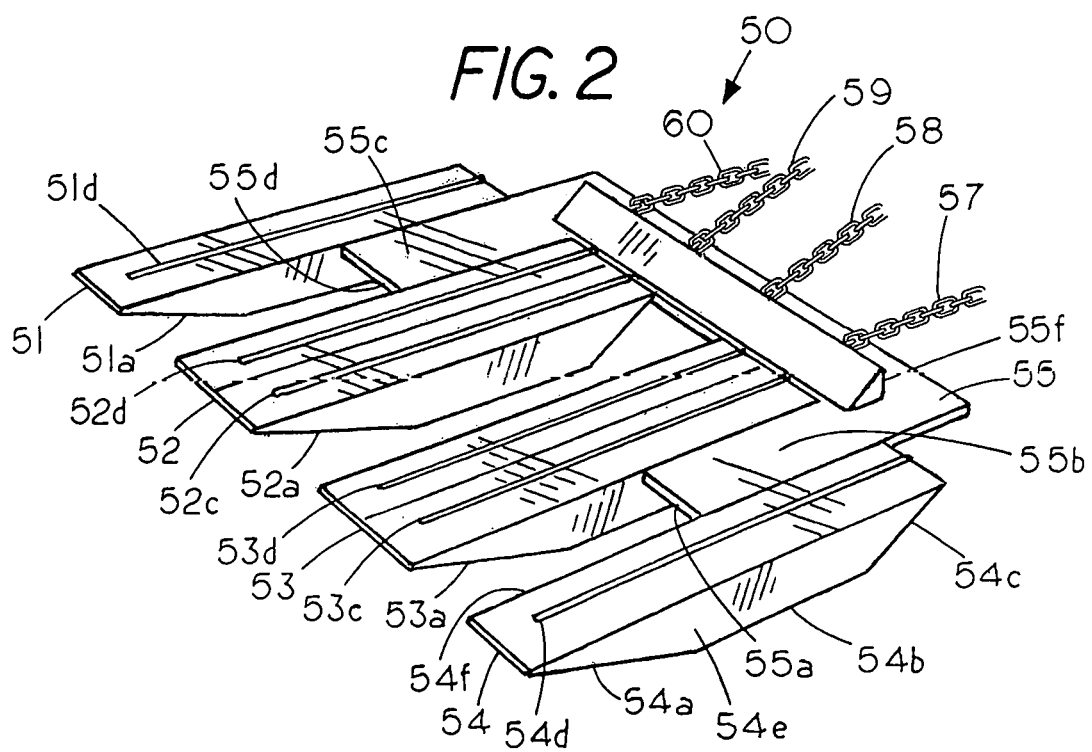
FIG. 2 is an isolated perspective view of a pallet wedge for disgorging a loaded double side pallet from a set of pallet forks.

FIG. 2 shows an isolated view of pallet wedge 50 for removing a pallet located on top of a pallet holder through ground engagement of pallet wedge 50. Pallet wedge 50 includes a set of ground runners 51, 52, 53, and 54 having a top surface forming a portion of a pallet deck 55. Pallet deck 55 includes a pallet deck section 55c extending between runners 51 and 52 and a pallet deck section 55b extending between runners 53 and 54. Located on the underside of deck section 55b is a pallet wedge lift surface 55a and located on the underside of deck section 55c is a pallet wedge lift surface 55d. Attached to the rear of pallet wedge 55 is a pallet wedge travel limiter comprising chains 58 and 59 and a pallet wedge retractor comprising chains 57 and 60.

FIG. 2 is an isolated perspective view of wedge 50 comprising a set of four trapezoidal shaped runners 51, 52, 53 and 54. Runner 54 includes an angled front face 54a, a ground engaging face 54b, an angled rear face 54c, a first side face 54e and a second side face 54f with the front and rear face each making an acute angle with ground engaging face 54b. Similarly, each of the runners 52, 53 and 54 contain a ground engaging face, a first side face, a second side face, an angled rear face and an angled front face to allow the runners to slide in either direction on the top of soil 8 without gouging the soil.

Located on top of runner 54 is a longitudinal rib 54d and located on top of runner 53 is a longitudinal rib 53c and a longitudinal rib 53d. Similarly, on top of runner 52 is a longitudinal rib 52c and a longitudinal rib 52d and on top of runner 51 is a longitudinal rib 51d. In operation the ribs thereon engage a bottom surface of the double sided pallet 21 to facilitate sliding of the pallet thereon free of wedge 50. In this example wedge 50 includes a rigid pallet deck 55 formed partially by the top side of runners 51, 52, 53 and 54 and a first rectangular rigid pallet plate 55b that extends between runners 53 and 54 and a second rectangular rigid pallet plate 55c that extends between runner 51 and 52. Pallet plate 55b has an undersurface 55a and pallet plate 55c has an undersurface 55d with each of the undersurfaces allowing wedge 50 to slide along the top surface of a pallet fork during the step of unloading a loaded pallet from the pallet forks as well as the step of returning wedge 50 to a loading position once the pallet thereon has slid free of wedge 50.

In this example, wedge 50 includes a tow plate 55f, which is attached to a flexible wedge travel limiter comprising a set of chains 59 and 58 and to a flexible wedge retractor comprising a set of chains 57 and 60. Although, a tow plate 55f is shown alternately the chains may be connected directly to pallet deck 55.

Figure 3:
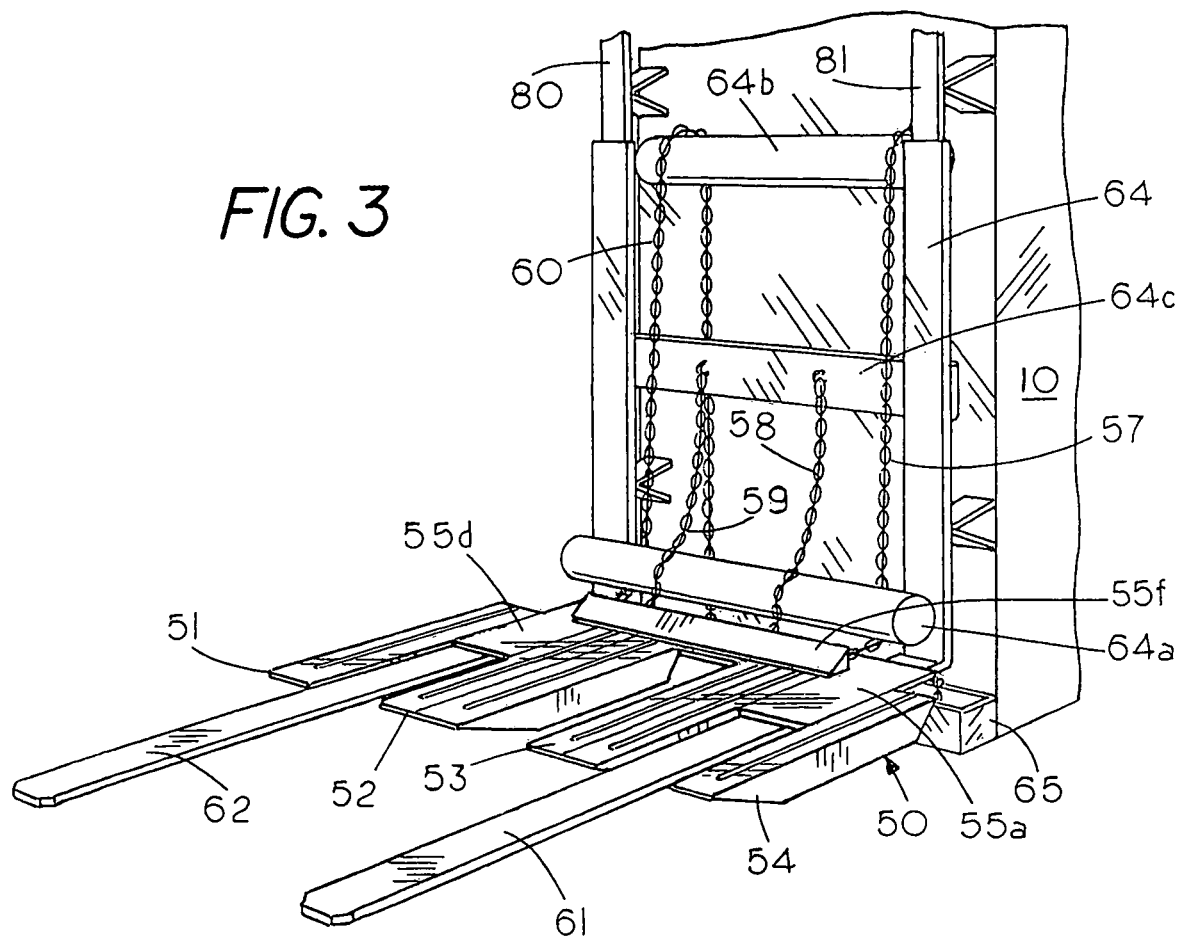
FIG. 3 is an isolated perspective view of a pallet wedge located on a set of pallet forks.
Figure 3A:
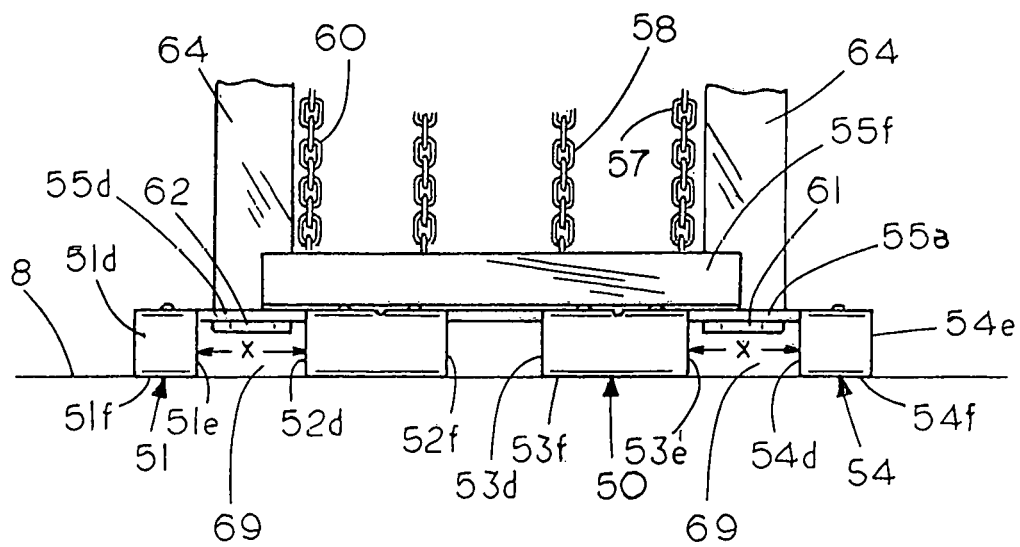
FIG. 3A is an end view of a pallet wedge located on a set of pallet forks.

FIG. 3 is an isolated perspective view of wedge 50 on a vertically displaceable pallet fork frame 64, which is vertically and slidably mounted on rails 80, and 81, which are attached to sod harvester 10. FIG. 3A is a partial end view of wedge 50 located in a pallet ready position on pallet holder 20 comprising a set of pallet forks 61 and 62. Pallet forks 61 and 62 attach to vertically displaceable pallet fork frame 64 with frame 64 having a first cross member 64c located between a top cylindrical cross member 64b and a bottom cylindrical cross member 64a. In the pallet ready position as shown in FIG. 3 pallet forks 61 and 62 extend forward of wedge 50 to support a front portion of a pallet thereon and wedge 50 supports a rear portion of a pallet thereon.

FIG. 3 shows that one end of wedge limit chain 58 attaches to cross member 64c and the other end of wedge limit chain 58 attaches to tow plate 55f. Similarly, one end of wedge limit chain 59 attaches to cross member 64c and the other end of wedge limit chain 59 attaches to tow plate 55f. Chains 58 and 59 are shown in a relaxed or slack condition in FIG. 3 with wedge 50 in the retracted condition or pallet ready position on top of pallet forks 61 and 62.

FIG. 3 shows wedge retraction chain 57 has one end attached to tow plate 55f and FIG. 4 shows the opposite end of retraction chain 57 attached to a chain anchor 65a, which is located in a chain container 65 with both chain anchor 65a and chain container 65 fixedly mounted to sod harvester 10.

Similarly, one end of retraction chain 60 attaches to tow plate 55f and the other end of retraction chain 60 attaches to an identical chain anchor (not shown), which is located in chain container 65. In this example chain container 65, which is fixedly mounted on sod harvester 10, provides temporary on-the-go chain storage for chains 57 and 60 as pallet frame 64 is lowered which allows chain 57 and chain 60 to fall into chain container 65 or pulls chain 57 and 60 from container 65 as pallet frame 64 is raised, which in this example pulls wedge 50 toward the base or rear of pallet fork frame 64.

Figure 6:
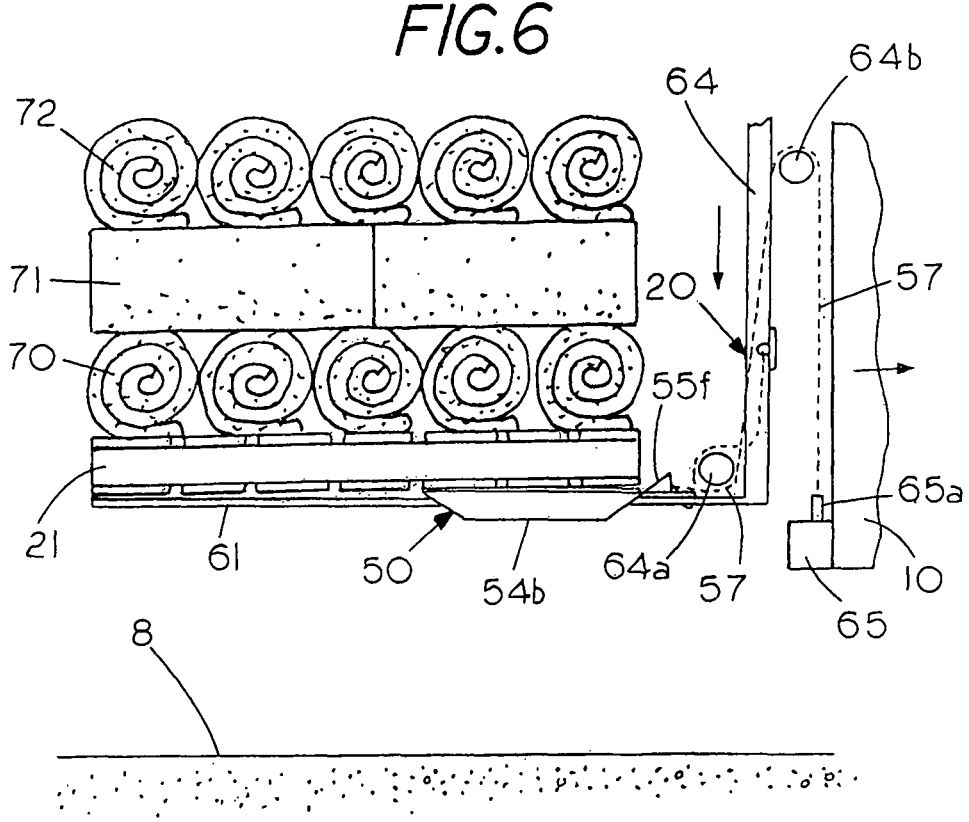
FIG. 6 is a side view of the pallet wedge and the pallet forks of FIG. 5 with rolls of sod located on top of the double sided pallet.

FIG. 4, FIG. 5 and FIG. 6 are side views showing wedge 50 located on pallet forks 61, 62 with wedge 50 in a pallet receiving position proximate the base of pallet fork frame 60. Note, wedge retraction chain 57 passes under cylindrical member 64a, which acts as chain guide, and over the top of cylindrical member 64b, which also acts as a chain guide, before attaching to chain anchor 65a in chain container 65. Similarly, wedge retraction chain 58 (FIG. 3) attaches in an identical manner to a separate identical chain anchor (not shown) in chain container 65 to allow wedge retraction chain 57 and wedge retraction chain 60 to pull in unison as pallet holder 20 is raised, which causes wedge 50 to slide from the cantilevered end of pallet forks 61, 62 to the base of the pallet forks as shown in FIG. 4. In this example cylindrical members 64a and 64b provide smooth surfaces for chains 57 and 60 to slide freely thereover during the raising and lowering of pallet forks 61 and 62.

FIG. 4 is a side view showing wedge 50 located on pallet holder 20 comprising pallet forks 61, 62 with wedge 50 in a pallet receiving position proximate the base of pallet fork frame 60 while FIG. 5 is a side view of wedge 50 with an empty double sided pallet 21 located on top of pallet forks 61, 62 and on top of wedge 50.

In the example shown in FIG. 5 one end of pallet forks 61, 62 supports the front portion of pallet 21 and the opposite end or base of pallet forks 61, 62 supports wedge 50, which supports the rear portion of pallet 21. Thus the weight of pallet 21 is distributed between the cantilevered end of pallet forks 61, 62 and wedge 50, which is supported by the base of pallet forks 61, 62.

FIG. 3 shows pallet fork frame 60 slidably engages a set of vertical rails 80 and 81 on sod harvester frame 10 enabling one to raise or lower pallet fork frame 60 with pallet forks 61, 62 with respect to ground 8 as sod harvester 10 continues to harvest sod.

FIG. 6 is a side view of wedge 50 and pallet fork 61 of pallet holder 20 showing three rows of sod 70, 71 and 72 stacked on top of double sided pallet 21 with pallet frame 60 about to begin a vertical descent that brings wedge 50 and one end of pallet 21 into ground engagement, which allows pallet forks 61, 62 of pallet holder 20 to be withdrawn from wedge 50 as the sod harvester continues is forward harvesting motion.

FIG. 7 is a side view showing pallet frame 60 in the descended or ground engaging position with the runners (51b, 52b, 53b, and 54b) on wedge 50 in contact with ground 8 (see FIG. 3A). In the down or ground engaging position, as shown in FIG. 7, wedge 50 supports one end of pallet 21 while the other end of pallet 21 remains in contact with pallet forks 61, 62. In some cases one may want to ensure that wedge 50 does not slide under pallet 21 when wedge 50 engages the ground. To prevent wedge 50 from sliding under pallet 2 tow plate 55f may be used as a pallet stop in the event the frictional forces between pallet 21 and wedge 50 are insufficient to prevent the wedge from sliding under the pallet.

FIG. 3A shows a partial end view of pallet fork 61 and pallet fork 62 extending under wedge 50. Located in a first gap or pallet fork slot 69 between face 53e of runner 53 and face 54d of runner 54 is pallet fork 61. Similarly, located in a second gap or pallet fork slot 69 between face 52d of runner 52 and face 51e of runner 51 is pallet fork 62. In this example pallet fork slots 69 each have a width and height greater than the width or height of a pallet fork extending therethrough to permit withdrawal of the pallet fork therefrom as the pallet wedge supports a loaded pallet thereon. That is, the width of pallet fork 61 is less than the distance x between the faces of adjacent runners 53 and 54 and the width of pallet fork 62 is less then the width x between faces of adjacent runners 51 and 52. The lateral side to side to side clearance between the pallet forks and the side faces of adjacent runner should be sufficient so that pallet forks do not bind with the side faces of the runners as the pallet forks are retracted from wedge 50 through a forward motion of sod harvester 10. Similarly, the vertical and lateral clearances between the pallet forks and the runners should be sufficiently large so that during pallet fork withdrawal pallet forks 61, 62 do not engage wedge plate undersides 55a and 55b to prevent or hinder withdrawal of the pallet forks from wedge 50 through the forward motion of the harvester 10 as wedge 50 engages ground 8. For example, a typical lateral clearance of an inch or more, as well as a vertical clearance of an inch or more between ground 8 and wedge face 55a and ground 8 and wedge face 55d is sufficient so that pallet forks 61 and 62 can easily be withdrawn from pallet 21 through the forward motion of sod harvester 10 although in some instances one may select less clearances as long as the pallet forks and wedge 50 can be easily withdrawn from wedge 50.

FIG. 4, FIG. 5 and FIG. 6 show pallet fork frame 64 in an up position with wedge 50 located at the base of pallet forks 61, 62 while FIG. 6 shows a double sided pallet 21 supported on one end by pallet forks 61, 62 and the other end of pallet 21 supported by wedge 50. In contrast, FIG. 7 shows pallet fork frame 64 in the down position proximate ground 8 to initiate transferring loaded sod pallet 21 onto ground 8 through ground engagement of wedge 50 as sod harvester 10 continues its forward motion.

Figure 8:
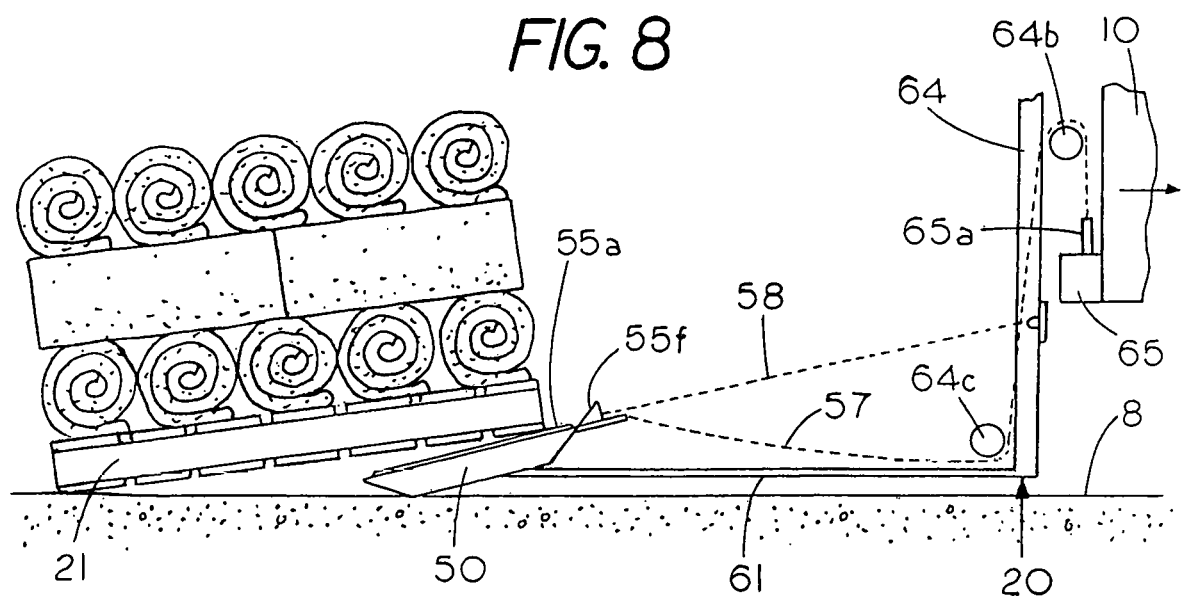
FIG. 8 shows the pallet wedge tilting as the double sided pallet slides off the top of the pallet wedge.
Figure 10:
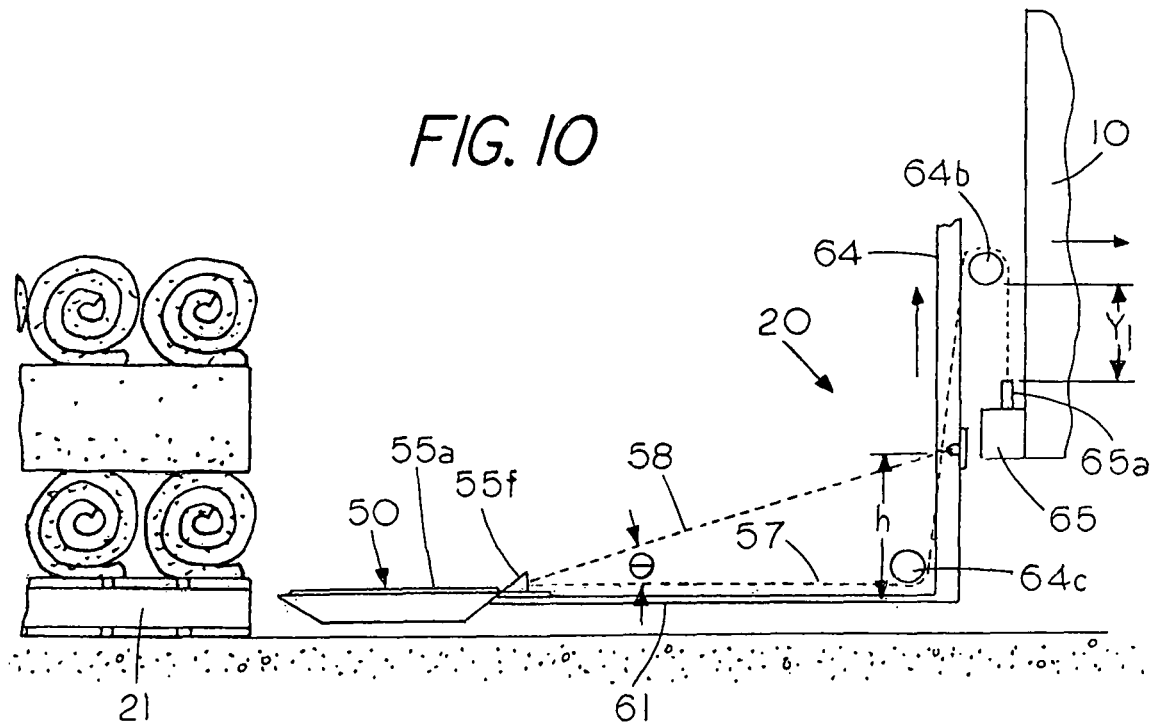
FIG. 10 is a side view showing the wedge tilted to a horizontal condition as a set of retraction chains begin to pull the pallet wedge into a pallet loading position through elevation of the pallet forks.

FIG. 7, FIG. 8 and FIG. 10 illustrate the steps of transferring a double side pallet 21 with sod rolls thereon from pallet forks 61, 62 and wedge 50 through ground engagement of wedge 50 as the sod harvester 10 continues a forward motion. FIG. 7 shows the first step with wedge 50 in ground engagement while pallet forks 61, 62, which are in a position for withdrawal from wedge 50. In this example the ground engagement of wedge 50 while the sod harvester 10 moves forward causes loaded sod pallet 21 with sod rolls 70, 71 and 72 and wedge 50 to remain stationary as pallet frame 64 and pallet forks 61, 61 move forward with sod harvester 10. Similarly, FIG. 7A is a side view of the pallet wedge and the set of pallet forks of FIG. 6 in a ground engaging condition except in this example sod slabs 84 are stacked on top of the double sided pallet 21.

Figure 9:
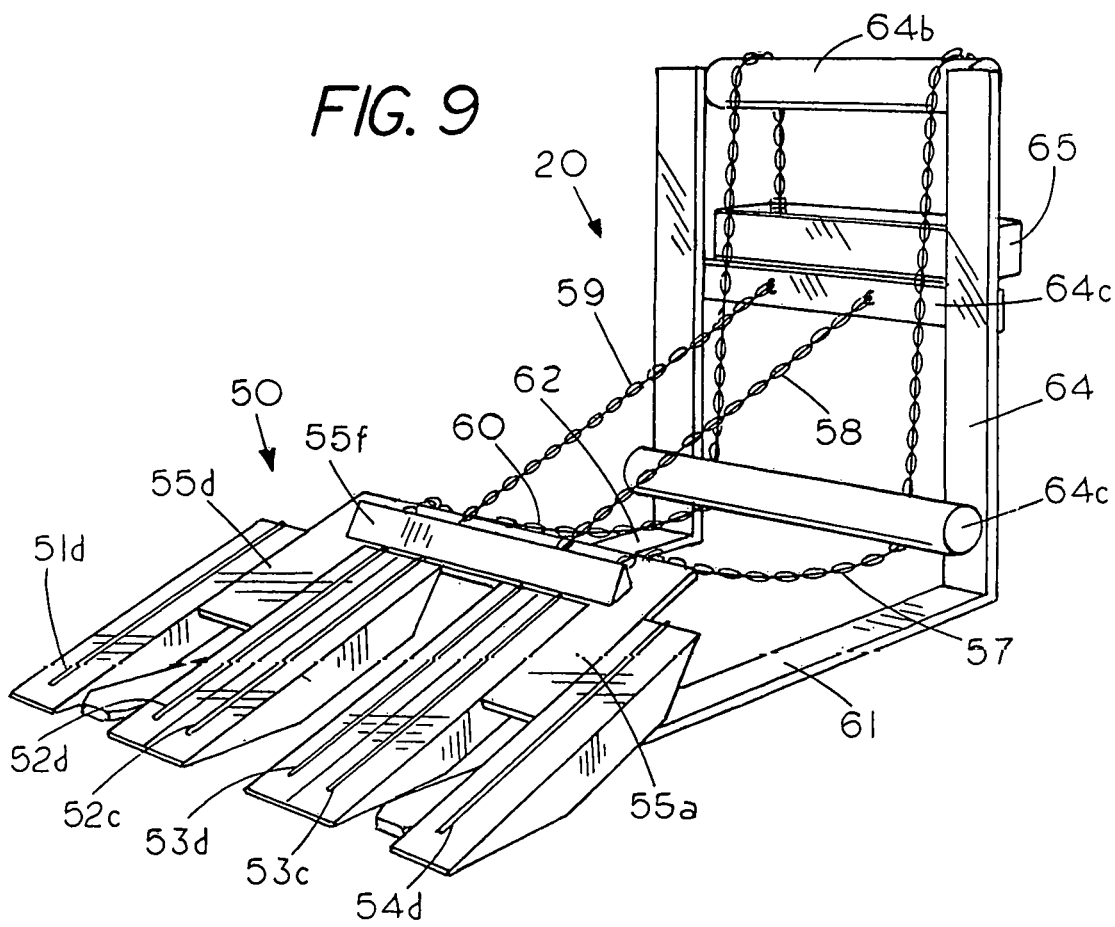
FIG. 9 is a perspective view showing the position of the wedge limit chains and the wedge retraction chains after the double side pallet has slid free of the pallet wedge.

In the second step, as shown in FIG. 8, sod pallet 21, which remains stationary, has one end in ground contact and the other end supported by wedge 50 as wedge 50 rests on the cantilevered ends of pallet forks 61, 62. Note, although pallet forks 61 and 62 have been displaced with respect to wedge 50 the cantilever ends of pallet forks 61, 62 remain in engagement with wedge 50 through a wedge travel limiter comprising chains 58 and 59. FIG. 8 shows loaded pallet 21 at the moment that pallet 21 slides down to earth along the top of wedge 50, which is moving forward, while FIG. 9 shows a perspective view of wedge 50 immediately after pallet 51 has slid free of wedge 50. Note, the attachment of one end of chains 58 and 59 at an elevated position on frame 64c not only restrains wedge 50 from sliding off pallet forks 61, 62 but also provides a tipping force on wedge 50 that assists in allowing the loaded pallet to slide off wedge 50 as shown in FIG. 8. That is, the attachment of the limit chains 58 and 59 to cross frame 64c a distance h above the pallet forks 61, 62 causes the wedge to tip or tilt as shown in FIG. 8 and FIG. 9 due to the tension on limit chains 58 and 59 thus allowing end of pallet 21 to slide along the rails 51d, 52d, 52c, 53d, 53c and 54d until pallet 21 is located on the ground as illustrated in FIG. 10. In the example shown limit chains 58 and 59 are attached a distance h above the wedge so as form an acute angle Θ between the pallet fork and the chain as shown in FIG. 10. While a minimum angle Θ may vary depending on the frictional characteristics of the pallet surface as well as the frictional characteristics of the wedge the angle Θ is preferably selected such that when the chains 58 and 59 are taut the wedge deck 55a and 55d as well as the runner top surfaces form an inclined ramp for the end of pallet 21 to slide down as illustrated in FIG. 8.

Typically, the angle Θ may range from about 10 degrees to 60 degrees, however in some cases one may elect not to tilt wedge 50 but allow pallet 21 to slide directly off the end of the deck on wedge 50. In the example shown travel limiter chains 58 and 50 have ends secured to pallet frame 64 at an attachment point height h, which is sufficient to form an acute angle Θ of at least 10 degrees with a surface of a pallet fork.

Figure 11:
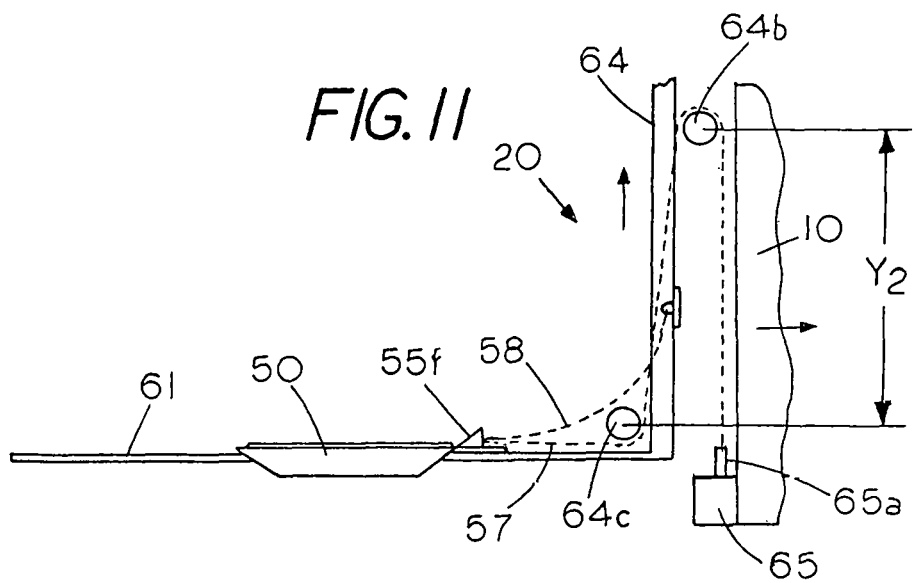
FIG. 11 is a side view showing the pallet wedge in the ready position to receive a double side pallet.

FIG. 10 shows wedge 50 returned to a horizontal position through the action of limit chains 58, 59 and retraction chains 57, 60 (see FIG. 9). In next step the retraction chains 57, 60 become taut as pallet fork frame 64 begins rising to a position to receive a further pallet. The arrow in FIG. 10 indicates pallet frame 64 initiating upward movement with wedge 50 located at the cantilevered end of the pallet forks while FIG. 11 shows the elevated condition of pallet frame 60. In the elevated condition wedge 50 has been retracted from the cantilever ends of the pallet forks 61, 62 through the passive action of retraction chains 57 and 60.

Reference to FIG. 10 and FIG. 11 reveals the function of retraction chain 57. The function of retraction chain 60 is identical and is not described herein. FIG. 10 shows that retraction chain 57 passes under cylindrical member 64c and then upward and over cylindrical member 64b with one end of chain 57 in engagement with anchor 65a, which is located in chain container 65 that is attached to sod harvester 10. The length of chain between pipe 64b and anchor 65a is indicated by $Y_1$ in FIG. 10. As pallet frame 66 raises upward the length of chain between pipe 64b and anchor 65a increase to $Y_2$ (see FIG. 11). As a result wedge 50, which is attached to the opposite end of chain 57, is automatically drawn back to the ready position at the base of pallet forks 61, 62 (FIG. 11) through the elevation of the pallet fork frame 64 to a position to receive a further pallet. Thus, a feature of the invention is that wedge 50 facilitates unloading of a double sided pallet from a pallet fork through ground engagement and when pallet 21 is unloaded from pallet holder 20 wedge 50 automatically slides from an unloading condition on the cantilever end of the pallet forks 61, 62 to a loading condition on the opposite or base end of the pallet forks through the elevation of the pallet holder 20.

Figure 12:
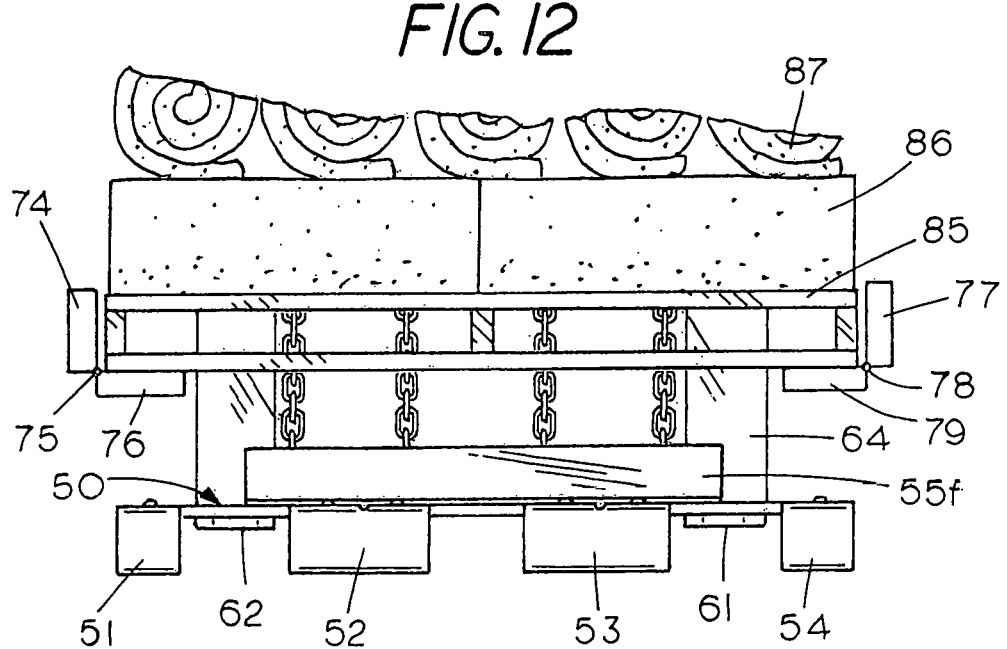
FIG. 12 is an end view showing a pair of lateral pallet supports holding a double sided pallet as the pallet forks are being elevated thereunder.

FIG. 12 is an end view showing a pair of lateral pallet supports 74, 75, 76 and 77 78 and 79 holding a double sided pallet 85 with a sod roll 86 and a sod roll 87 as the pallet forks 61, 62 are being elevated thereunder.

Figure 13:
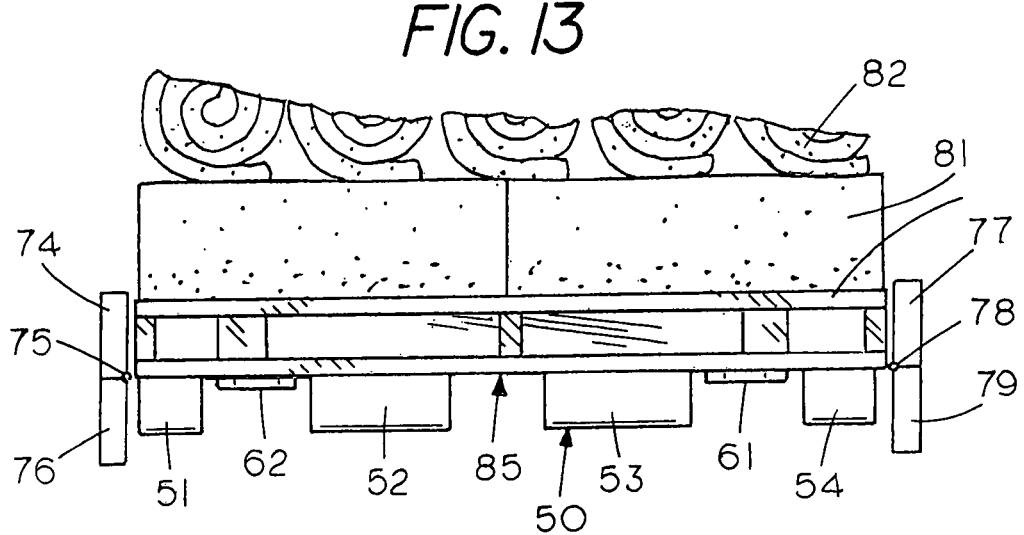
FIG. 13 is an end view showing the pair of lateral pallet supports have been released to allow the pallet forks and pallet wedge to support the double sided pallet thereon.

FIG. 13 is an end view showing the pair of lateral pallet supports 74, 75, 76 and 77, 78 and 79 have been released to allow the pallet forks 61, 62 and pallet wedge 50 to support the double sided pallet thereon.

I claim:

1. A pallet wedge for removing a pallet located on top of a pallet holder through ground engagement of the pallet wedge including:
    a pallet deck;
    a set of ground runners supporting said pallet deck;
    a pallet wedge lift surface on an underside of said pallet deck;
    a pallet wedge travel limiter secured to said pallet wedge;
    a pallet wedge retractor secured to said pallet deck, said wedge retractor comprising a chain having an end securable to a sod harvester housing; and
a chain container for attachment to the sod harvester housing for chain storage.

2. The pallet wedge of claim 1 including at least two ground runners with each having an angled front face and an angled rear face.

3. The pallet wedge of claim 1 wherein the chain has an end securable to a pallet frame with the end secured at a height sufficient to form an acute angle of at least 10 degrees with a surface of a pallet fork.

4. The pallet wedge of claim 1 wherein a portion of the pallet deck extends over a portion of the set of ground runners.

5. The pallet wedge of claim 1 including a set of ribs on said pallet deck.

6. The pallet wedge of claim 1 wherein the wedge extends upward from the pallet deck to provide a pallet stop to prevent the wedge from sliding under a pallet when the wedge is in ground engagement with the pallet deck having sod slabs in either flat or roll form thereon.

7. A pallet system for on-the-go ground disengagement of a loaded pallet comprising:
    an elevateable fork lift frame;
    a loaded pallet holder attached to said fork lift frame;
    a pallet wedge slideable mounted on said pallet holder with said pallet wedge having a runner for ground engagement and a pallet deck for supporting a pallet thereon;
    a travel limiter secured to pallet wedge and to said pallet holder to limit lateral travel of said loaded pallet wedge along said pallet holder; and
    a pallet retractor having a first end secured to said pallet wedge, said pallet retractor extending around a pair of guides with a second end of the pallet retractor in engagement with a fixed housing so that elevation of the fork lift frame with respect to the housing retracts the pallet wedge to a pallet support position on the set of pallet forks.

8. The pallet system of claim 7 wherein the pair of guides comprise a first cylindrical member and a second cylindrical member extending horizontally across the forklift frame with the first cylindrical member and the second cylindrical member vertically spaced from each other.

9. The pallet system of claim 7 wherein the travel limiter is attached sufficiently vertically upward on said fork lift frame so that extending the travel limiter to a taut condition tilts the pallet deck.

10. The pallet system of claim 7 wherein the pallet retractor comprises a chain that slidingly extends under the first cylindrical member and slidingly over the second cylindrical member.

11. The pallet system of claim 10 including a container for storing the chain therein during raising and lowering of said fork lift frame.

12. The pallet system of claim 7 when the pallet wedge includes a first pallet fork slot and a second pallet fork slot each having a width and height greater than the width or height of a pallet fork extending therethrough to permit withdrawal of the pallet fork therefrom as the pallet wedge supports a loaded pallet thereon.

13. The pallet system of claim 7 wherein the pallet deck includes a set of ribs for supporting a pallet thereon.

14. The pallet system of claim 7 wherein the pallet wedge includes at least two runners with each of the runners having an angle front face and an angle rear face.

15. The pallet system of claim 7 wherein pallet wedge include a tow plate for securing the travel limiter and the pallet retractor thereto.

16. The pallet system of claim 7 wherein the pallet wedge includes at least four runners.

17. The method of ground removal of a loaded double sided pallet from a pallet holder comprising:
- supporting a pallet wedge having ground runners on the pallet holder;
- attaching the pallet wedge to a pallet holder frame with a travel limiter;
- placing a double sided pallet on the pallet wedge and on the pallet holder;
- loading the double-sided pallet;
- lowering the pallet holder to bring the pallet wedge ground runners and the double sided pallet into ground engagement; and
- pulling the pallet wedge free of the double-sided pallet through a forward movement of the pallet holder while the double sided pallet remains in ground engagement.

18. The method of claim 17 including the step of removing the double-sided pallet during a forward motion of the pallet fork by tilting the double-sided pallet until a portion of the double-sided pallet engages the ground during a forward motion of the pallet fork.

19. The method of claim 18 including the step of returning the pallet wedge from a discharge position to a ready position by raising the pallet holder to activate a wedge retractor.

20. The method of claim 17 wherein the step of loading the double-sided pallet comprise loading the double-sided pallet with sod slabs.

21. The method of claim 17 including step of retracting the pallet wedge to a loading position by elevating the pallet holder.

22. The method of claim 17 including the step of tilting the pallet wedge through ground engagement of the pallet runners while preventing the pallet wedge from sliding off the pallet fork.

23. The method of claim 17 wherein the step of attaching the pallet deck to the pallet frame with a travel limiter comprises attaching one end of a chain to a tow plate on the pallet deck and an other end of the chain to the pallet holder frame.

24. The method of claim 23 wherein the other end of the chain attaches to the pallet holder frame so as to generate an upward force on the pallet wedge to tilt the pallet deck.

25. A pallet wedge for removing a pallet located on top of a pallet holder containing a set of pallet forks where the pallet is removable from said pallet holder through ground engagement of the pallet wedge with the pallet wedge including:
- a pallet deck supporting a portion of a loaded pallet on said pallet holder;
- a set of ground runners supporting said pallet deck;
- a pallet wedge lift surface on an underside of said pallet deck;
- a pallet wedge travel limiter secured to said pallet wedge; and
- a retractor secured to said pallet deck.

* * * * *